United States Patent [19]

Timm et al.

[11] 4,228,014
[45] Oct. 14, 1980

[54] APPARATUS FOR DESALINATION AND PURIFICATION OF WATER BY REVERSE OSMOSIS AND ULTRAFILTRATION

[75] Inventors: Hans Timm; Sören Fries, both of Geesthacht; Axel Wenzlaff, Escheburg, all of Fed. Rep. of Germany

[73] Assignee: Gesellschaft für Kernenergieverwertung in Schiffbau und Schiffahrt mbH, Geesthacht, Fed. Rep. of Germany

[21] Appl. No.: 5,221

[22] Filed: Jan. 22, 1979

[30] Foreign Application Priority Data

Jan. 23, 1978 [DE] Fed. Rep. of Germany ....... 2802780

[51] Int. Cl.² ............................................. B01D 13/00
[52] U.S. Cl. ........................... 210/321 R; 210/433 M; 210/347; 210/488
[58] Field of Search ........... 210/321 R, 321 B, 321 A, 210/96.2, 541, 346, 433 M, 488, 85, 347; 422/48

[56] References Cited

U.S. PATENT DOCUMENTS

| | | | |
|---|---|---|---|
| 3,841,837 | 10/1974 | Kitrilakis et al. | 210/321 B |
| 3,847,818 | 11/1974 | Madsen et al. | 210/321 R |
| 4,115,274 | 4/1978 | Boddeker et al. | 210/321 R |
| 4,132,649 | 2/1979 | Croopnick et al. | 210/321 R |
| 4,145,293 | 3/1979 | Cook | 210/321 A |
| 4,154,792 | 5/1979 | Miller et al. | 210/321 B |

Primary Examiner—Charles N. Hart
Assistant Examiner—E. Rollins Cross
Attorney, Agent, or Firm—Becker & Becker, Inc.

[57] ABSTRACT

An apparatus for the desalination and purification of water by reverse osmosis and ultrafiltration. The apparatus includes dish-like carrier plates and water guide plates held between two end plates and alternately stacked one above the other. The apparatus also includes annular diaphragms which lie between respective carrier plates and guide plates and are each backed by a filter layer, so that in use untreated water flows over the diaphragms in the radial direction on the side opposite the filter layer, and permeate or water suitable for industrial use is drawn off at the side backed by the filter layer. The stack of end plates, carrier plates, and guide plates is clamped or held together at the periphery and has a continuous central aperture for the introduction of the untreated water. The carrier plates sealingly engage one another by means of thickened marginal portions lying radially beyond the edges of the guide plates. The marginal portions have continuous bores which are aligned with one another and with bores in the end plates, and provide an outlet for the permeate. The bores, toward the middle of the plates, communicate with the filter layers of the diaphragms by means of gaps 34 produced by reduced thicknesses of the marginal portions of the carrier plates.

13 Claims, 6 Drawing Figures

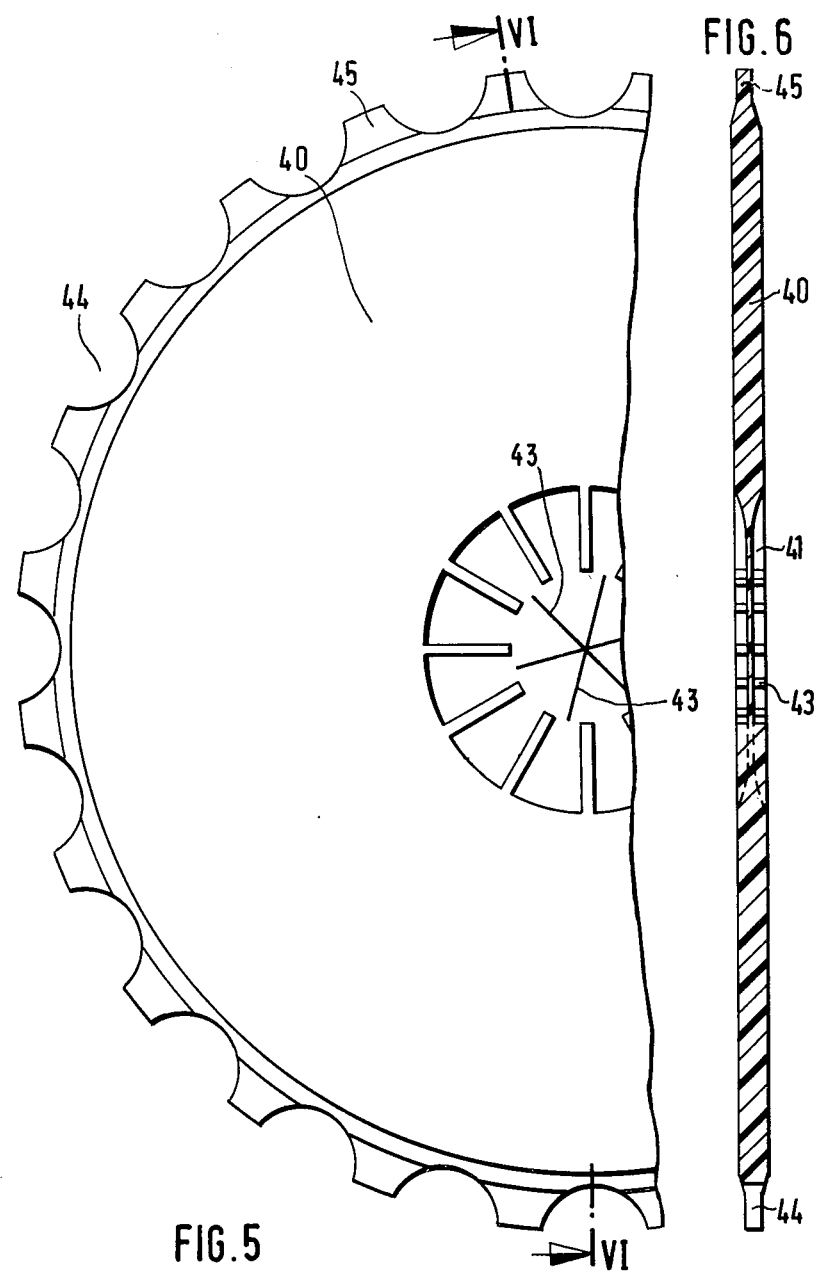

APPARATUS FOR DESALINATION AND PURIFICATION OF WATER BY REVERSE OSMOSIS AND ULTRAFILTRATION

The present invention relates to an apparatus for the desalination and purification of water by reverse osmosis and ultrafiltration. The apparatus comprises dish-like carrier plates and water guide plates held between two end plates and alternately stacked one above the other; the apparatus also comprises annular diaphragms or membranes which lie between respective carrier plates and guide plates and are each backed by a filter layer so that in use, untreated water flows over the diaphragms in the radial direction on the side opposite the filter layer, and permeate or water suitable for industrial use is drawn off at the side backed by the filter layer.

Previously known water desalination apparatuses of the above-mentioned type, such as are known from United States Patent No. 3,847,818, Madsen et al, issued Nov. 12, 1974, have numerous disadvantages. Since a central clamp bolt, which passed through central apertures in the individual plates, was used to hold the stack of plates together, the replacement of diaphragms could only be effected with difficulty because even when a single diaphragm was replaced, the entire stack had to be dismantled after removal of the clamp bolt. A further disadvantage to the previously known desalination apparatuses of the type referred to above is that the permeate emerged from the entire periphery of the stack of plates, so that the stack of plates could not, in itself, form a closed system but required a separate collecting trough. A particular disadvantage with these previously known desalination apparatuses, however, is the great probability of damage to diaphragms, a disadvantage which also arises with other previously known clamp bolts if the clamping pressure also acts at least partially on the diaphragms. In this connection, it must be pointed out that the possibility of re-using the diaphragms is an important factor with regard to the economy of desalination plants. Experience has shown that the diaphragm costs amount to about 20% of the total plant costs, which is a considerable expense considering the current diaphragm price of about DM (German marks) 100/m². Particular importance must be attributed to this problem when the plant is used for processing contaminated waste water, in which case frequent cleaning of the diaphragms is necessary. In all previously known plants, this involves considerable expense.

It is therefore an object of the present invention to provide an improved water desalination and water purification apparatus which is easy to assemble, has relatively low production costs, comprises only a few different components, and protects the diaphragms as a result of the fact that they are acted upon, not by the clamping pressure, but exclusively by the pressure of the untreated water which is introduced.

This object, and other objects and advantages of the present invention, will appear more clearly from the following specification in connection with the accompanying drawings, in which:

FIG. 5 shows a broken-away plan view of a guide plate; and

FIG. 6 shows a cross section taken along the section line VI—VI of FIG. 5.

The apparatus for desalination and purification of water according to the present invention is characterized primarily in that the stack of plates is clamped or held together at the periphery and has a continuous central aperture for the introduction of the untreated water. Furthermore, the carrier plates sealingly engage one another by means of thickened marginal portions lying beyond the edges of the guide plates. The marginal portions have continuous bores which are aligned with one another and provide an outlet for the permeate. The bores, toward the middle of the plates, communicate with the filter layers of the diaphragms by means of gaps produced by reduced thicknesses of the marginal portions of the carrier plates.

In connection with the drawings, it should be pointed out that the number of plate elements may be selected as desired. The various figures of the drawings show different numbers of guide and carrier plates between the end plates, the number shown being small, and different in different figures, solely for ease of illustration.

Figure 1:
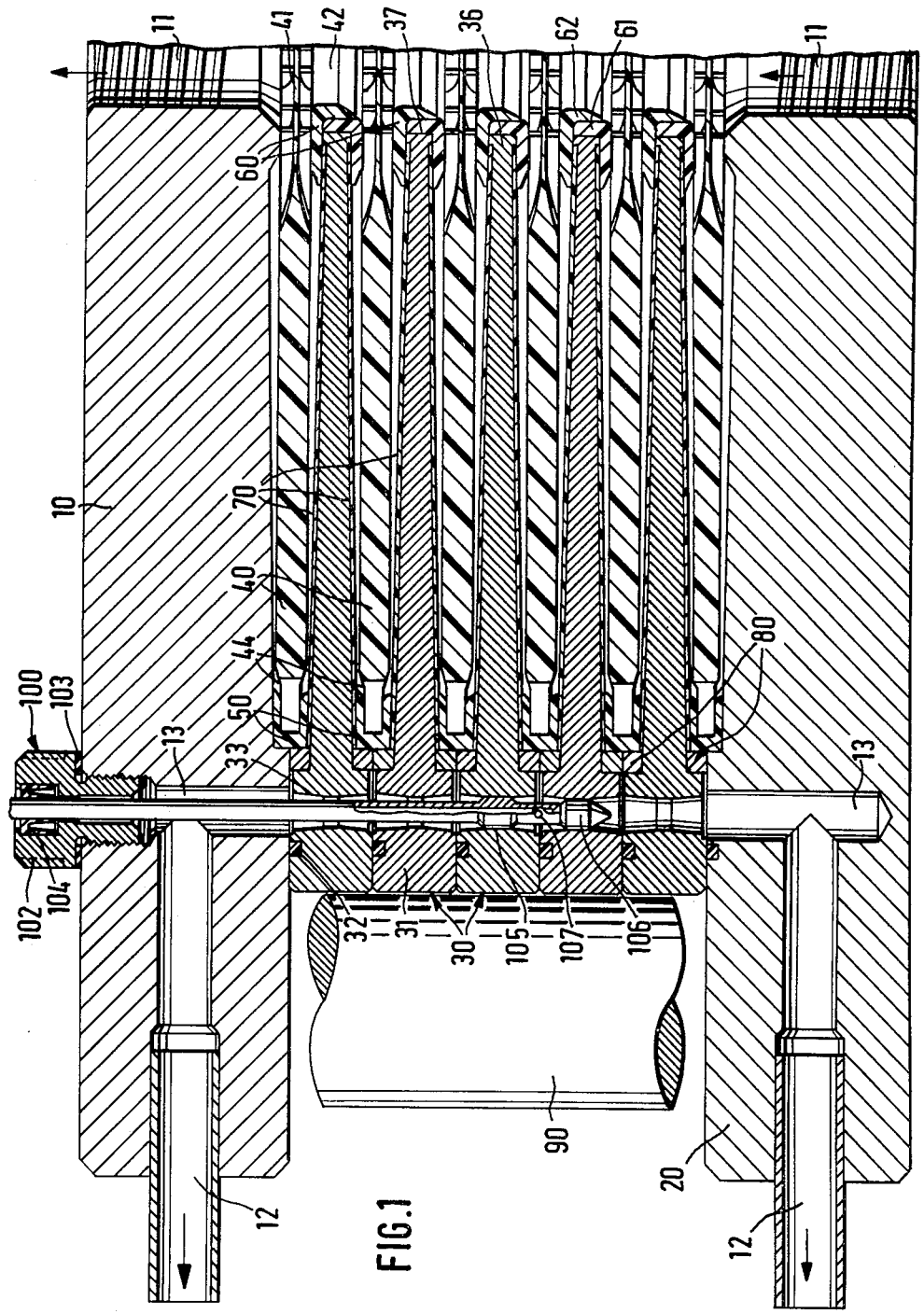
FIG. 1 is a radial section through an apparatus according to the invention for the desalination and purification of water.

Referring now to the drawings in detail, the apparatus of FIG. 1 comprises two end plates 10 and 20 having relatively thick walls. Between these end plates 10 and 20 are located carrier plates 30 and guide plates 40, which are disposed so as to be alternately stacked. On the guide plates 40 there are outer seals 50 and inner seals 60. Diaphragms or membranes 70 are located on opposite sides of the carrier plates 30, with filter layers respectively situated between the carrier plates 30 and the diaphragms 70. Holding rings 80 serve as radial outer boundaries of the guide plates 40 and their outer seals 50. A plurality of clamp bolts 90, which are disposed around the periphery of the stack of plates and are anchored in the end plates 10 and 20, serves to hold the stack of plates together. A probe 100 is provided to check the proper operation of the water treatment apparatus.

In the middle of the end plates 10 and 20, which are preferably constructed in the form of circular discs, there is a central aperture 11, through which the untreated water which is to be desalinated is conveyed; in the drawing this would occur from the bottom toward the top. Furthermore, the end plates 10 and 20 are provided with one or more radially directed permeate drain-off bores 12. These bores 12 lead into an axially directed permeate drain-off bore 13. This bore 13 lies outside the holding rings 80 in the radial direction.

Figure 4:
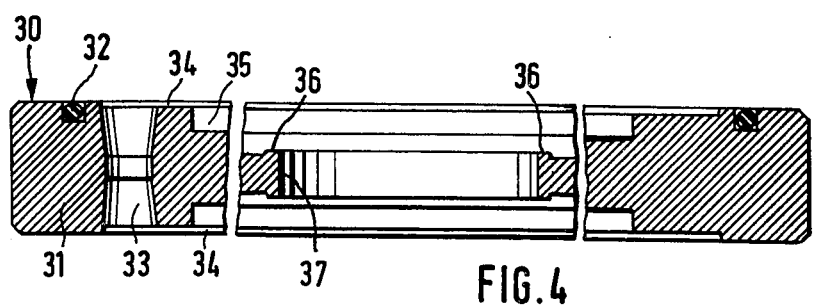
FIG. 4 shows an enlarged broken away diametrical section of a carrier plate through the encircled portions IVa, IVb, IVc of FIG. 2.

The shape of the carrier plates 30, which are located between the end plates 10 and 20, can be seen particularly clearly from FIG. 4. The carrier plates 30 are provided with a planar parallel marginal portion 31, the axially directed end faces of which bear with a sealing action against one another or against the inside surfaces of the end plates 10 and 20. An O-ring seal 32, which extends all around, is disposed in the one axially directed end face of the marginal portion 31 for the sealing. Axial bores 33, which during the assembly are aligned with the axial bore 13 of the end plates 10 and 20, are provided in the carrier plates 30 within the ring seal 32. The bore 33 may be cylindrical but is preferably constructed in such a way that it diverges somewhat from the middle outwards for the probe 100 which is to be described later. The portion of the carrier plate 30 following the bore 33 has a somewhat smaller thickness, so that, when the carrier plates are stacked, gaps 34 develop through which the permeate can reach the axial bore 33 in a manner to be explained in more detail later. Towards the middle, the axial thickness of the carrier plate 30 is reduced beyond a step surface 35, so that the spacing between adjacent carrier plates 30 becomes steadily greater towards the middle in this region. Between the step surface 35 and an annular flange 36, the oblique wall portions of the carrier plate 30 form a support for the annular diaphragms or membranes 71, with filter layers respectively situated between the carrier plate 30 and the diaphragms 71. The annular flanges 36 are located directly next to a central bore 37 of the carrier plates 30. This bore 37 is aligned with the central bore 11 of the end plates 10 and 20.

Figure 2:
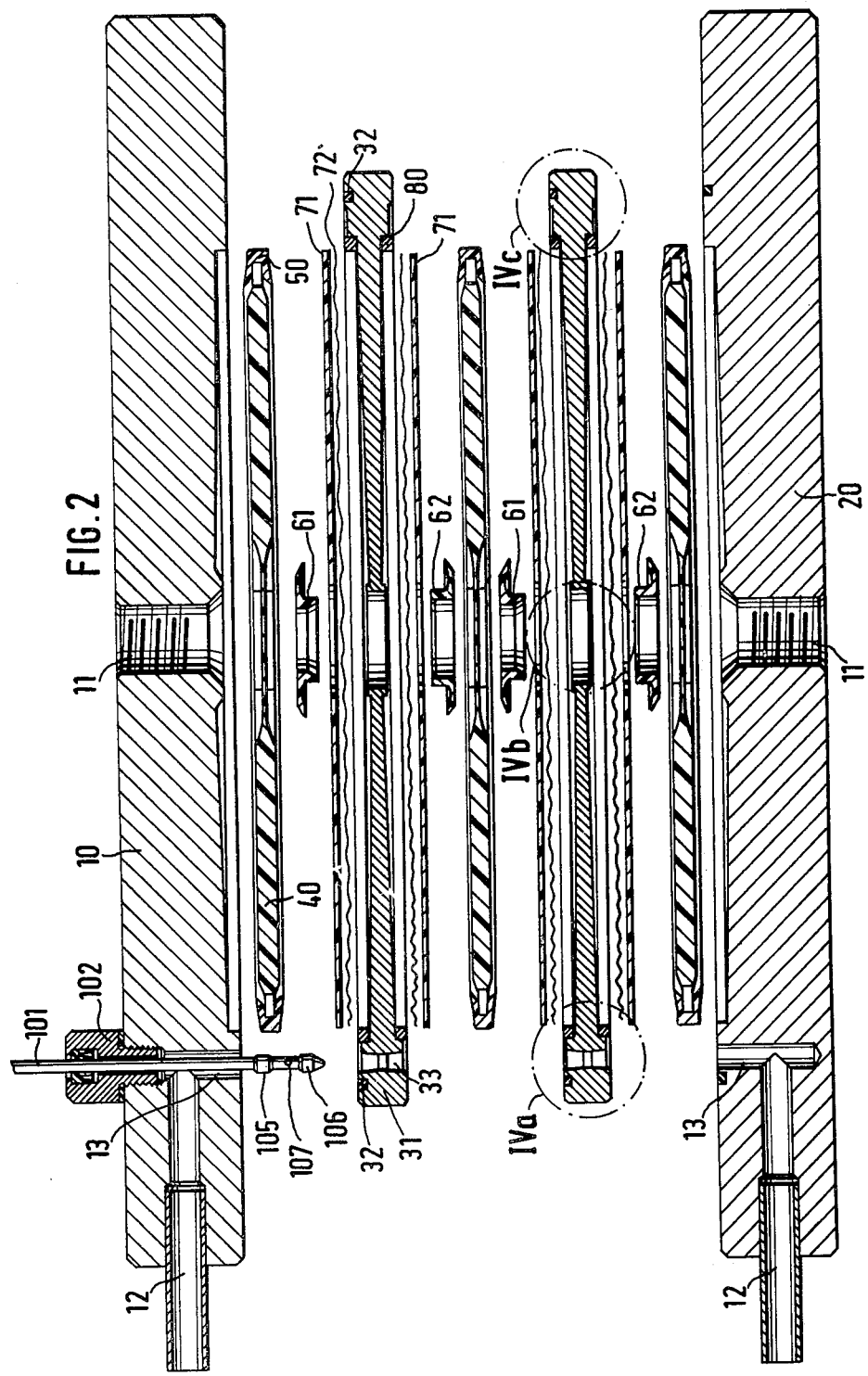
FIG. 2 is an exploded drawing, in diametrical section, through the apparatus according to the invention for the treatment of water, on a somewhat smaller scale.
Figure 3:
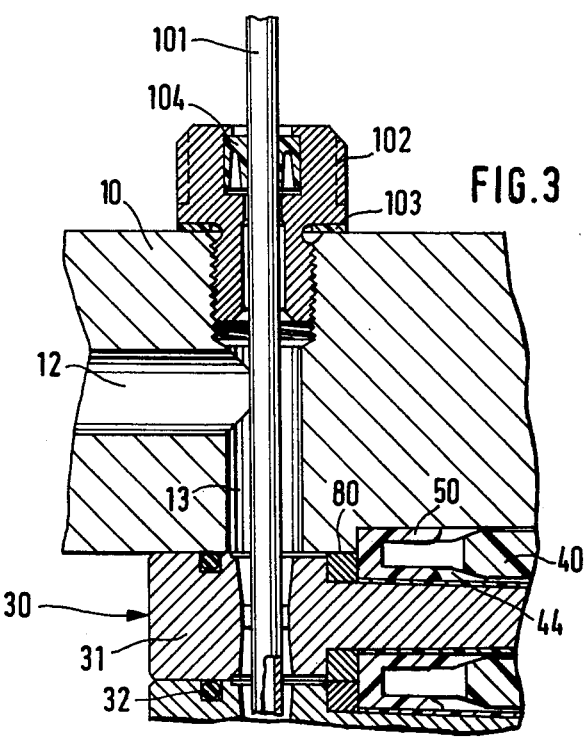
FIG. 3 shows a partial cross-section, on a larger scale than FIG. 1, through an end plate with a stuffing box for the introduction of a test probe.

The guide plates 40 lie in the disc-shaped space between the individual carrier plates 30 or between the outermost carrier plates and the correspondingly recessed adjacent surfaces of the end plates 10 and 20 (FIG. 2). Whereas the carrier plates 30 preferably comprise corrosion-resistant metal or plastic material, the guide plates 40 are made of plastic material. As shown in FIGS. 5 and 6, the guide plates 40, which are constructed with substantially parallel walls over a larger annular section, have a thinner central portion 41 which passes through the central bores 11 and 37, so that cylindrical bore compartments or sections 42 (FIG. 1) are formed in these central bores 11 and 37. The reduced central portions 41 of the guide plates 40 are provided with narrow radial slits 43, so that this central portion 41 of the guide disc 40 can take over the function of an excess-pressure valve if an excess pressure develops upon blockage of a plate element. This opening central portion 41 of the guide disc 40 can then short-circuit an element of a stack of plates, without failure of the whole unit occurring; after a reduction in the excess pressure, the plate again closes normally. At the outer edge of the guide plate 40, there are notches 44, between which tooth portions 45 remain. These tooth portions 45 carry a ring seal 50 (FIGS. 2 and 3) having a U-shaped cross section. The seal 50 only extends so far over the individual teeth 45 that portions of the notches 44 form passages between the two sides of the guide plate 40. It should be noted that the U-shaped outer guide plate seals 50 come to bear against adjacent carrier plates 30 or end plate surfaces. The pressure of the permeate entering the notches 44 ensures a satisfactory sealing of the edges of the guide plates 40.

In the abovementioned cylindrical compartments 42 of the central bore 11, 37, between the central portions 41 of the guide plates 40, there are located two sealing rings 61 and 62 of L-shaped cross section (FIG. 1). This inner seal 60 is made in two parts because its assembly is facilitated in this manner. The opposite arms of the seal 60 extend over the annular flange 36 of the carrier plate 30 and cover the diaphragms 71 and filter layers 72 which are disposed on the carrier plate surfaces.

It can be seen from the preceding description that the untreated water entering at the lower end of the central bore 11 can flow radially, in zigzag fashion, through the stack of plates. With reference to FIG. 1, the untreated water at first collects in front of a central portion 41 of the guide plate 40, so that the untreated water flows radially outwards along the guide plate 40, then is deflected to the opposite side of the guide plate 40 at the notches 44, and then again flows back radially to the middle and reaches the next cylindrical compartment 42. The first converging and then diverging flow cross sections take into consideration the fact that the outer portion of the stack of plates has a larger area than the inner portion.

At the end of the flow through, the residual water which is not desalinated or purified and so is concentrated flows away again at the upper end of the central bore 11. The above description of the flow through also shows that the inner seals 60 are pressed, by the inflowing untreated water, against the carrier plate surfaces 30 which are covered with the diaphragms and filter layers. Just like the outer U-shaped seals 50, the diaphragm-filter-layer arrangement can only be acted upon in conformity with the maximum pressure of the untreated water because the clamping pressure with the clamp bolts 90 only acts on the marginal portions 31 of the carrier plates 30.

As already mentioned above, the annular disc-like diaphragm 71 extends in the radial direction from the annular flange 36 to the inner periphery of the holding ring 80 and, in special cases, as far as the step surface 35. On the other hand, the filter layer 72, which is disposed below the diaphragm, that is to say between the diaphragm 71 and the surface of the carrier plate 30, always extends as far as the step surface 35. Therefore, the permeate which has passed through the diaphragm 71, beneath the U-shaped seal 50, can reach the step surface 35 of the carrier plate 30. In order that the permeate may be able to reach the gap 34 and hence the axial bores 33 and 13, and thereby the permeate drain-off bore 12, from this step surface 35, the holding rings 80 are provided, at their radially outwardly lying peripheral surface, with fine channels which are preferably produced by knurling.

In principle, the filter layers 72 are drainage layers to draw off the permeate, for example fine fabric in a thickness of about 0.1 mm with a thread spacing of about 25 microns. In this connection, it may also be mentioned that the holding or water guide rings 80 have a thickness in the axial direction which corresponds to the depth of the step surface 35 less the thickness of the filter layer.

The apparatus for water desalination and water purification according to the invention has numerous advantages, which are listed as follows:

the ability to be used in all pressure ranges up to 100 bar, very simple assembly without assembly aids, no additional seals at the end plates, no deformation of the diaphragms by the seals, low initial stressing of the tie bars and therefore low initial deformation of the seals, complete encapsulation of the permeate space, drawing off of the permeate as pressure water, no idle running of the unit in the event of disturbances, free run-off of the permeate through the filter layer and the edge of the holding ring, complete lining of the inner chamber by the diaphragms and the seals, free selection of material (metal or plastic) for the guide discs, definite flow direction of the untreated water over the diaphragms, guide discs which do not require any special surface treatment, supporting of diaphragm and filter layer on a planar surface, and lateral offtake of the permeate without bores or slots in the supporting surface.

A particular advantage is obtained by using the apparatus according to the invention for purifying waste water. Ridding the diaphragms of deposits (algae, foul substances), which is necessary in this case from time to time, necessitates only a very short interruption in operation. In this case, the diaphragms are so dimensioned that they reach as far as the step surface 35 and thus rest, held by the holding ring 80, firmly on the carrier plate 30. After the tie rods have been released, the carrier plates 30 can be removed from the stack one by one, be wiped or rinsed, and then be immediately stacked again. The diaphragms remain smooth and unharmed in their position.

In operation, the apparatus for water desalination according to the invention can be checked for proper operation of the individual plate elements in a particularly simple manner. A probe 100 in the form of a tubular rod 101 serves this purpose and can be introduced by means of a stuffing box 102 which is screwed into the end plate 10. The stuffing box 102 is sealed with a sealing ring 103 relative to the end plate 10, and with a ring seal 104 of U-shaped cross section relative to the tubular rod 101. The tubular rod 101, the outside diameter of which is smaller than the bore 33, comprises, at its front end, two piston portions 105 and 106, the central spacing of which corresponds to the thickness of a carrier plate 30. Between the two piston portions 105 and 106 is a radial bore 107 which communicates with the interior of the tubular rod 101. In order to check the desalination apparatus, the tubular rod 101, that is, the probe 100, can be introduced in such a way that the region between the two piston portions 105 and 106 can receive the permeate from the annular gap 34; the permeate then emerges at the outer end of the tubular rod 101, where it can be examined and measured. In connection with the piston portions 105 and 106, it has proved advisable to construct the bores 33 of the individual carrier plates 30 in such a way that they diverge somewhat from the middle outwards and only in their central portion have a diameter which corresponds to the diameter of the piston portions 105 and 106. Outside the stuffing box 102, markings may be provided on the tubular rod 101 for reading off where the probe 100 is in relation to the stack of plates.

The present invention is in no way restricted to the specific disclosure of the specification or drawings, but also encompasses any modifications within the scope of the appended claims.

What we claim is:

1. An apparatus for the desalination and purification of water by reverse osmosis and ultrafiltration in a closed system which is stationary and continuously operable to hold back salt as well as suitable for high pressure required for economically gaining useful water, which comprises in combination:

two end plates respectively provided with a peripheral axially directed bore, at least one of which passes entirely through the pertaining end plate;

dish-like carrier plates and water guide plates which are alternately stacked one above the other and are held together between said end plates to form a stack held together at the peripheral region of all of said plates, said stack having a continuous central axially oriented aperture for the introduction of untreated water through an inlet at one end of said stack, said carrier plates sealingly engaging one another by means of thickened marginal portions thereof located radially outwardly of the peripheral edges of said guide plates, said marginal portions being respectively provided with a continuous axially directed bore, the respective bores of said marginal portions being aligned with one another and with the bores of said end plates to provide an outlet for permeate;

annular diaphragms respectively arranged between respective carrier plates and guide plates; said diaphragms being water permeable and being acted upon exclusively by pressure of untreated water which is introduced; and filter layers respectively located between respective diaphragms and carrier plates to allow untreated water to flow over said diaphragms in a radial direction on that side of said diaphragms opposite said filter layers, and to allow permeate to be drawn off on that side of said diaphragms adjacent said filter layers, said marginal portions of said carrier plates being provided with gaps respectively provided on their axially directed surfaces radially inwardly of said marginal portion bores so that said last mentioned bores communicate with the pertaining filter layers.

2. An apparatus in combination according to claim 1, in which said guide plates respectively are provided at their radially outer edges with sealing rings of U-shaped cross section which overlap said guide plates, the axially directed lateral surfaces of said sealing rings respectively engaging the pertaining diaphragm.

3. An apparatus in combination according to claim 2, in which the central portions of said guide plates cover said central aperture of said stack of plates and divide said central aperture into cylindrical compartments, each of which communicates with two opposite surfaces, covered with diaphragms and filter layers, of one of said carrier plates, and in which each guide plate is provided at its radially outer edge with axially directed water passages located partially within the associated sealing ring of U-shaped cross section.

4. An apparatus in combination according to claim 3, in which each guide plate is provided at its outer periphery with a plurality of water passages in the form of notches which form passages for the untreated water between the two sides of the respective guide plates with that portion of said notches not covered by said U-shaped sealing ring.

5. An apparatus in combination according to claim 3, in which said central portions of said guide plates have a reduced cross section relative to the remaining portion of said guide plate and include a portion constructed to open reversibly under excess pressure.

6. An apparatus in combination according to claim 3, in which said excess pressure protection portion of each guide plate comprises a plurality of narrow radial slits.

7. An apparatus in combination according to claim 3, in which the central aperture of each carrier plate is surrounded by two sealing rings of L-shaped cross section which overlap one another, the free arms of said last mentioned sealing rings holding the diaphragms and filter layers against the pertaining carrier plate on both sides.

8. An apparatus in combination according to claim 3, in which said filter layers project radially beyond said diaphragms and said sealing rings of said guide plates and, at their projecting marginal portions, communicate with the permeate offtake gaps between adjacent carrier plates.

9. An apparatus in combination according to claim 8, in which the respective peripheral seal of each guide plate is surrounded by a holding ring, one axially directed end face of which engages the projecting marginal portion of the pertaining filter layer of the diaphragm, and the radially directed outer peripheral surface of which is provided with fine channels through which permeate from the pertaining filter layer can reach the pertaining gap between adjacent carrier plates.

10. An apparatus in combination according to claim 3, in which said fine channels are in the form of an external knurling of said holding ring.

11. An apparatus according to claim 1, in which said guide plates comprise plastic and said carrier plates comprise one of the materials selected from the group consisting of corrosion-resistant metal and plastic.

12. An apparatus in combination according to claim 3, in which each of said filter layers comprises a fine plastic fabric having a thickness of about 0.1 mm with a thread spacing of about $25\mu$.

13. A probe for checking the operation of the apparatus of claim 3, said probe in combination:
a stuffing box provided in one of said end plates and having a bore which is coaxial to said peripheral bore of said end plate,
and a tubular rod which is introduceable through said stuffing box and has a probe head with a radial bore leading into the interior of said rod between two piston-like thickened portions spaced in conformity with the spacing of said carrier plates.

* * * * *